(12) United States Patent
Momosaki et al.

(10) Patent No.: US 8,023,702 B2
(45) Date of Patent: Sep. 20, 2011

(54) INFORMATION PROCESSING APPARATUS AND CONTENT DISPLAY METHOD

(75) Inventors: Kohei Momosaki, Mitaka (JP); Kunifumi Tsuda, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 128 days.

(21) Appl. No.: 12/503,716

(22) Filed: Jul. 15, 2009

(65) Prior Publication Data

US 2010/0104144 A1    Apr. 29, 2010

(30) Foreign Application Priority Data

Oct. 23, 2008  (JP) ................................ 2008-273279

(51) Int. Cl.
    *G06K 9/00*    (2006.01)
(52) U.S. Cl. ........................................................ 382/118
(58) Field of Classification Search .................... 382/118
    See application file for complete search history.

(56) References Cited

U.S. PATENT DOCUMENTS

| | | | |
|---|---|---|---|
| 6,035,055 A * | 3/2000 | Wang et al. | 382/118 |
| 2006/0285824 A1 * | 12/2006 | Osaki | 386/83 |
| 2009/0169065 A1 * | 7/2009 | Wang et al. | 382/118 |
| 2010/0008547 A1 * | 1/2010 | Yagnik et al. | 382/118 |

FOREIGN PATENT DOCUMENTS

| | | | |
|---|---|---|---|
| JP | 2006-033659 A | | 2/2006 |
| JP | 2006-250925 A | | 9/2006 |
| JP | 2007-214708 | * | 8/2007 |
| JP | 2007-214708 A | | 8/2007 |
| JP | 2007-251296 A | | 9/2007 |
| JP | 2008-066925 A | | 3/2008 |
| JP | 2008-118395 A | | 5/2008 |

OTHER PUBLICATIONS

Explanation of Non-English Language References.
Notice of Reasons for Rejection mailed by Japan Patent Office on Dec. 22, 2009 in the corresponding Japanese patent application No. 2008-273279.

* cited by examiner

*Primary Examiner* — Tom Lu
(74) *Attorney, Agent, or Firm* — Knobbe, Martens, Olson and Bear, LLP

(57) ABSTRACT

According to one embodiment, an information processing apparatus includes a temporary storage module configured to extract performer names from a program information corresponding to a video content data, collate a extracted performer names with a names stored in a storage module, collate collation face images corresponding to the names that match the performer names with a plurality of face images, and temporarily store, out of the plurality of face images, coincident face images that match the collation face images, and a display module configured to, when displaying a list of video content data, display the program name and the coincident face images corresponding to each video content data together with the video content data.

6 Claims, 11 Drawing Sheets

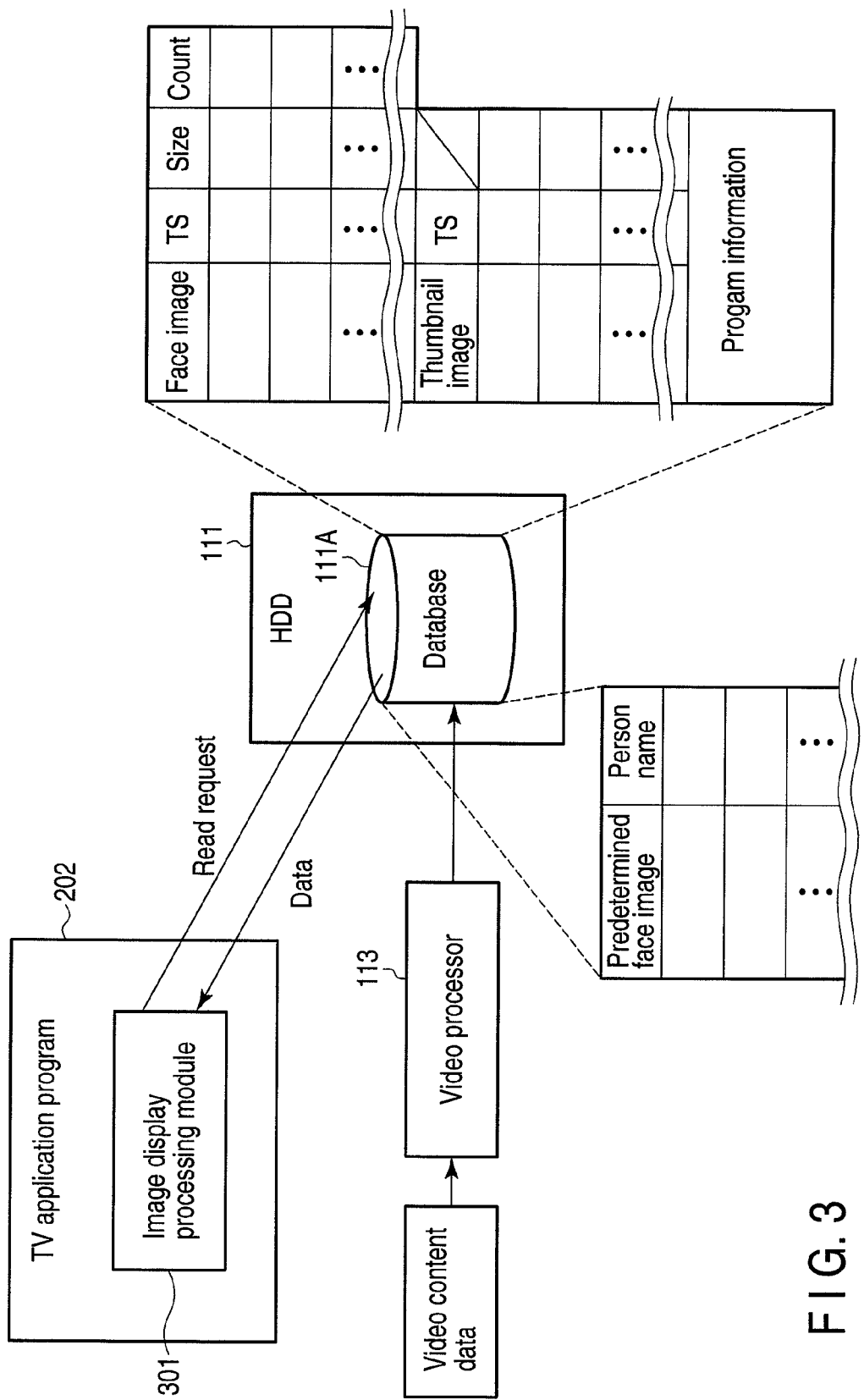
F I G. 3

Program information

| Program name | ○△ sports |
|---|---|
| Date / time | 1, August, 0:00-1:00 |
| Performers | Taro Nippon, Akemi Toukai, Hanako Kansai ····· |
|  |  |
| Program name | News X |
| Date | 5, August, 8:00-8:15 |
| Performers | Taro Tokyo, Hanako Chiba····· |

FIG. 4

INFORMATION PROCESSING APPARATUS AND CONTENT DISPLAY METHOD

CROSS-REFERENCE TO RELATED APPLICATIONS

This application is based upon and claims the benefit of priority from Japanese Patent Application No. 2008-273279, filed Oct. 23, 2008, the entire contents of which are incorporated herein by reference.

BACKGROUND

1. Field

One embodiment of the present invention relates to an information processing apparatus and a content display method for displaying a face image in recorded video content data together with its program name.

2. Description of the Related Art

An information processing apparatus such as a video recorder or a personal computer can generally record and play back various kinds of video content data such as a TV program data. In this case, a title is added to each video content data stored in the information processing apparatus. However, it is difficult for a user to ascertain details of video content data by only its title. To ascertain details of video content data, the video content data needs to be played back. However, playing back long-playing video content data takes a long time even using, e.g., a fast-forward function.

Jpn. Pat. Appln. KOKAI Publication No. 2007-214708 discloses an apparatus which extracts a performer name from received electronic program information, collates the extracted performer name with a face image database stored in advance, and displays a coincident face image in the face image database together with the performer name.

However, when a face image stored in advance is displayed, as in Jpn. Pat. Appln. KOKAI Publication No. 2007-214708, the user cannot refer to the face image of the person in recorded video content data. The image in the face image database stored in advance is different from the face image of the person in the actually recorded video content data, and this may generate a gap. For example, a daily change in the outer appearance such as the hair style or makeup is not reflected. Additionally, the image in the face image database stored in advance becomes old with the lapse of time. This may produce a gap to the face image of the person in the actually recorded video content data.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram for explaining the face image list display function of the information processing apparatus according to the embodiment;

FIG. 4 is an exemplary view showing an example of program information used in the information processing apparatus according to the embodiment;

DETAILED DESCRIPTION

Figure 1:
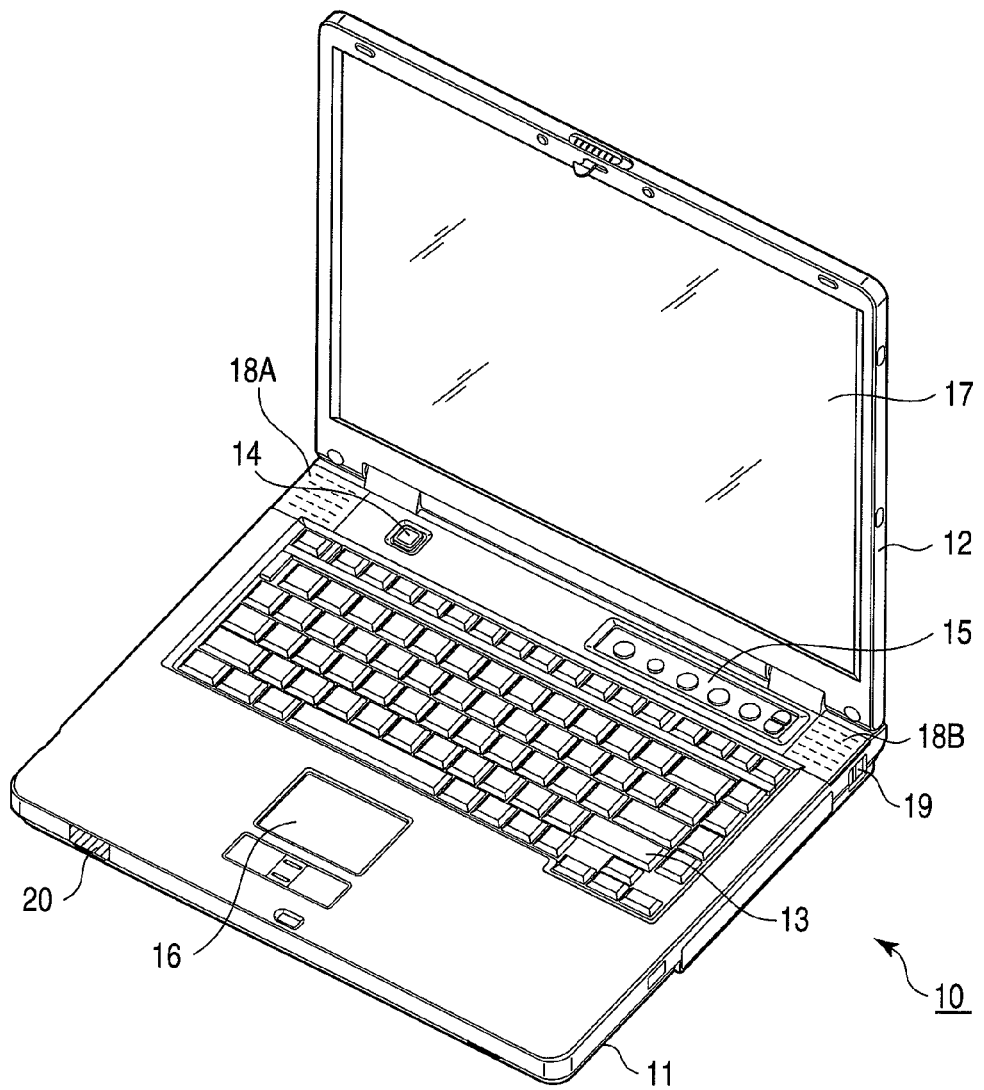
FIG. 1 is an exemplary perspective view showing an example of the outer appearance of an information processing apparatus according to an embodiment of the present invention.

Various embodiments according to the invention will be described hereinafter with reference to the accompanying drawings. In general, according to one embodiment of the invention, an information processing apparatus includes: a reception module configured to receive video content data and program information including a program name and performer names of the video content data; an extraction module configured to extract a plurality of face images from the video content data received by the reception module; a storage module configured to store a plurality of collation face images and names corresponding to the plurality of collation face images; a temporary storage module configured to extract performer names from the program information corresponding to the video content data, collate the extracted performer names with the names stored in the storage module, collate collation face images corresponding to the names that match the performer names with the plurality of face images, and temporarily store, out of the plurality of face images, coincident face images that match the collation face images; and a display module configured to, when displaying a list of video content data, display the program name and the coincident face images corresponding to each video content data together with the video content data.

An embodiment of the present invention will now be described with reference to the accompanying drawing.

The arrangement of an information processing apparatus according to an embodiment of the present invention will be described with reference to FIGS. 1 and 2. The information processing apparatus of the embodiment is implemented by, e.g., a notebook personal computer 10 functioning as an information processing apparatus.

The personal computer 10 can record and play back video content data such as broadcast program data or video data input from an external device. That is, the personal computer 10 has a television (TV) function to view and record program data broadcast by a TV broadcasting signal. The TV function is implemented by, e.g., a TV application program installed in the personal computer 10 in advance. The TV function also includes a function of recording video data input from an external AV device, and a function of playing back recorded video data and recorded broadcast program data.

The personal computer 10 also has a face image list display function of displaying, e.g., a list of face images of persons in video content data such as video data or broadcast program data stored in the personal computer 10. The face image list display function is implemented as, e.g., one of the functions of the TV function. The face image list display function is a function of presenting an outline and the like of video content data to a user. The face image list display function can display a face image (to be referred to as a face image thumbnail hereinafter) extracted from entire video content data. The function can also collate extracted face images with face images stored in advance (to be referred to as predetermined face images hereinafter) based on performer names in electronic program information, and display a list of face image thumbnails (to be referred to as coincident face images hereinafter) that have matched upon collation, performer names, recorded video content data, and program titles. Coincident face images can be displayed in the same order as the performer name display order in electronic program information. Alternatively, the appearance count of each coincident face image in video content data may be measured to display coincident face images in descending order of appearance count. It is also possible to create a favorite priority list to preferentially display, on top, a performer name in the priority list, or preferentially display, on top, a performer name corresponding to a user-designated one of collated coincident face images.

FIG. 1 shows a perspective view of the computer 10 whose display unit is open. The computer 10 includes a computer main body 11, and a display unit 12. The display unit 12 incorporates a display device formed from a thin-film-transistor liquid crystal display (TFT-LCD [display module]) 17.

The display unit 12 is attached to the computer main body 11 so as to freely pivot between an open position at which the upper surface of the computer main body 11 is exposed and a close position at which the display unit 12 covers the upper surface of the computer main body 11. The computer main body 11 has a thin box-shaped case. A keyboard 13, a power button 14 to power on/off the computer 10, an input operation panel 15, a touchpad 16, and loudspeakers 18A and 18B are arranged on the upper surface of the computer main body 11.

The input operation panel 15 is an input device for inputting an event corresponding to a pressed button, and includes a plurality of buttons to activate a plurality of functions. The buttons also include operation buttons to control the TV functions (view, record, and playback of recorded broadcast program data/video data). The computer main body 11 has, on its front, a remote controller interface 20 to communicate with a remote controller which remote-controls the TV functions of the computer 10. The remote controller interface 20 includes an infrared signal reception module.

The computer main body 11 has, on, e.g., its right side surface, a TV broadcasting antenna terminal 19. The computer main body 11 has, on, e.g., its rear surface, an external display connection terminal conforming to, e.g., the High-Definition Multimedia Interface (HDMI) standard. The external display connection terminal is used to output video data (moving image data) contained in video content data such as broadcast program data to an external display.

The system configuration of the computer 10 will be described with reference to FIG. 2.

Figure 2:
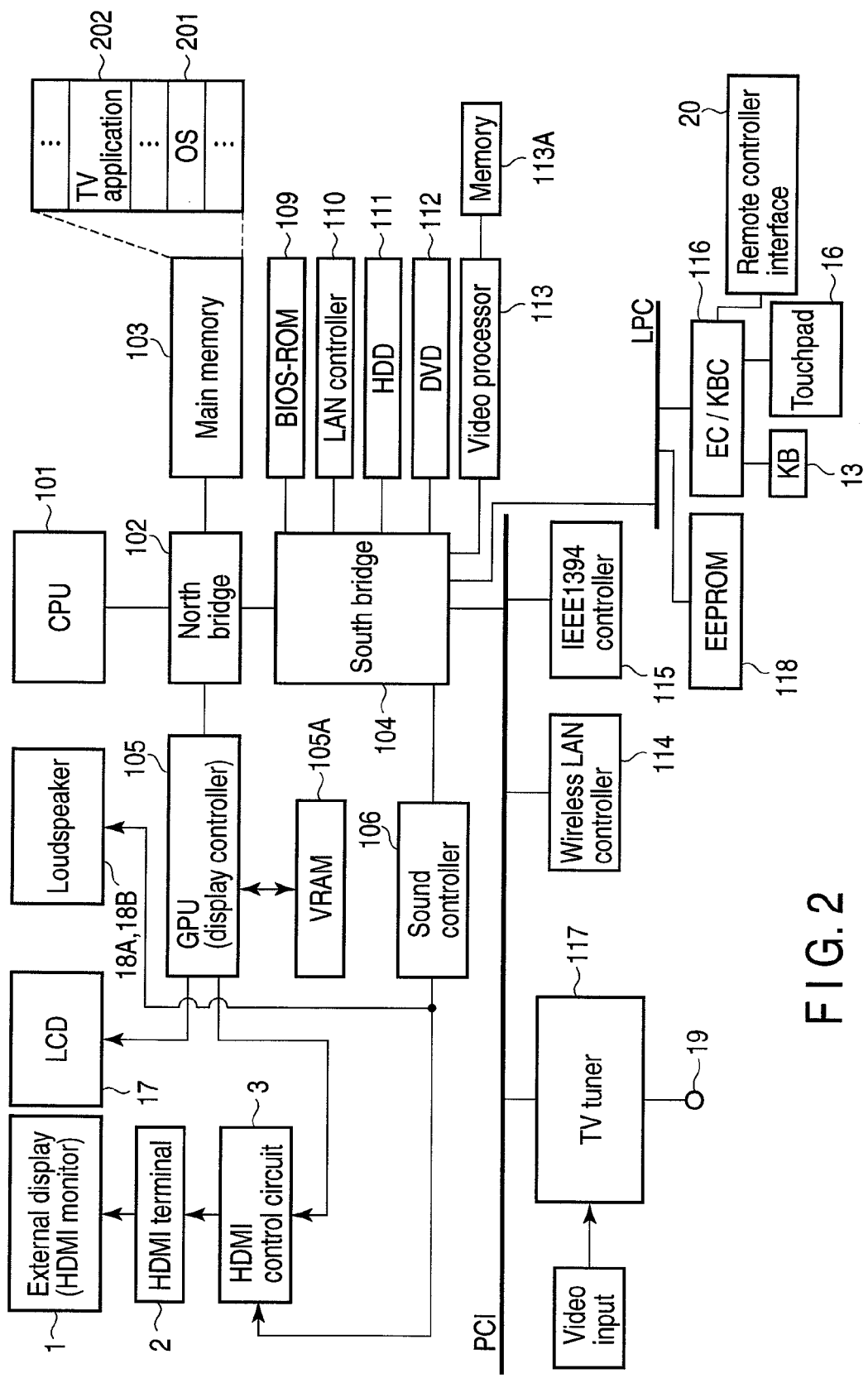
FIG. 2 is an exemplary block diagram showing an example of the system configuration of the information processing apparatus according to the embodiment.

As shown in FIG. 2, the computer 10 includes a CPU 101, north bridge 102, main memory 103, south bridge 104, graphics processing unit (GPU) 105, video memory (VRAM) 105A, sound controller 106, BIOS-ROM 109, LAN controller 110, hard disk drive (HDD) 111, DVD drive 112, video processor 113, memory 113A, wireless LAN controller 114, IEEE 1394 controller 115, embedded controller/keyboard controller (EC/KBC) 116, TV tuner 117, and EEPROM 118.

The CPU 101 is a processor to control the operation of the computer 10 and executes an operating system (OS) 201, and various application programs such as a TV application program 202, which are loaded from the hard disk drive (HDD) 111 to the main memory 103. The TV application program 202 is software to execute the TV functions. The TV application program 202 executes live playback processing of viewing broadcast program data received by the TV tuner 117, recording processing of recording received broadcast program data in the HDD 111, and playback processing of playing back broadcast program data/video data recorded in the HDD 111. The CPU 101 also executes a basic input/output system (BIOS) stored in the BIOS-ROM 109. The BIOS is a program for hardware control.

The north bridge 102 is a bridge device to connect the local bus of the CPU 101 to the south bridge 104. The north bridge 102 also incorporates a memory controller to control access to the main memory 103. The north bridge 102 also has a function of communicating with the GPU 105 via, e.g., a serial bus of the PCI EXPRESS standard.

The GPU 105 is a display controller to control the LCD 17 serving as the display monitor of the computer 10. A display signal generated by the GPU 105 is sent to the LCD 17. The GPU 105 can also transmit a digital video signal to an external display device 1 via an HDMI control circuit 3 and an HDMI terminal 2.

The HDMI terminal 2 is the above-described external display connection terminal. The HDMI terminal 2 can send a non-compressed digital video signal and a digital audio signal to the external display device 1 such as a TV set via a single cable. The HDMI control circuit 3 is an interface to send a digital video signal to the external display device 1 called an HDMI monitor via the HDMI terminal 2.

The south bridge 104 controls devices on a Low Pin Count (LPC) bus and devices on a Peripheral Component Interconnect (PCI) bus. The south bridge 104 incorporates an Integrated Drive Electronics (IDE) controller to control the HDD 111 and the DVD drive 112. The south bridge 104 also has a function of communicating with the sound controller 106.

The video processor 113 is connected to the south bridge 104 via, e.g., a serial bus of the PCI EXPRESS standard.

Figure 6:
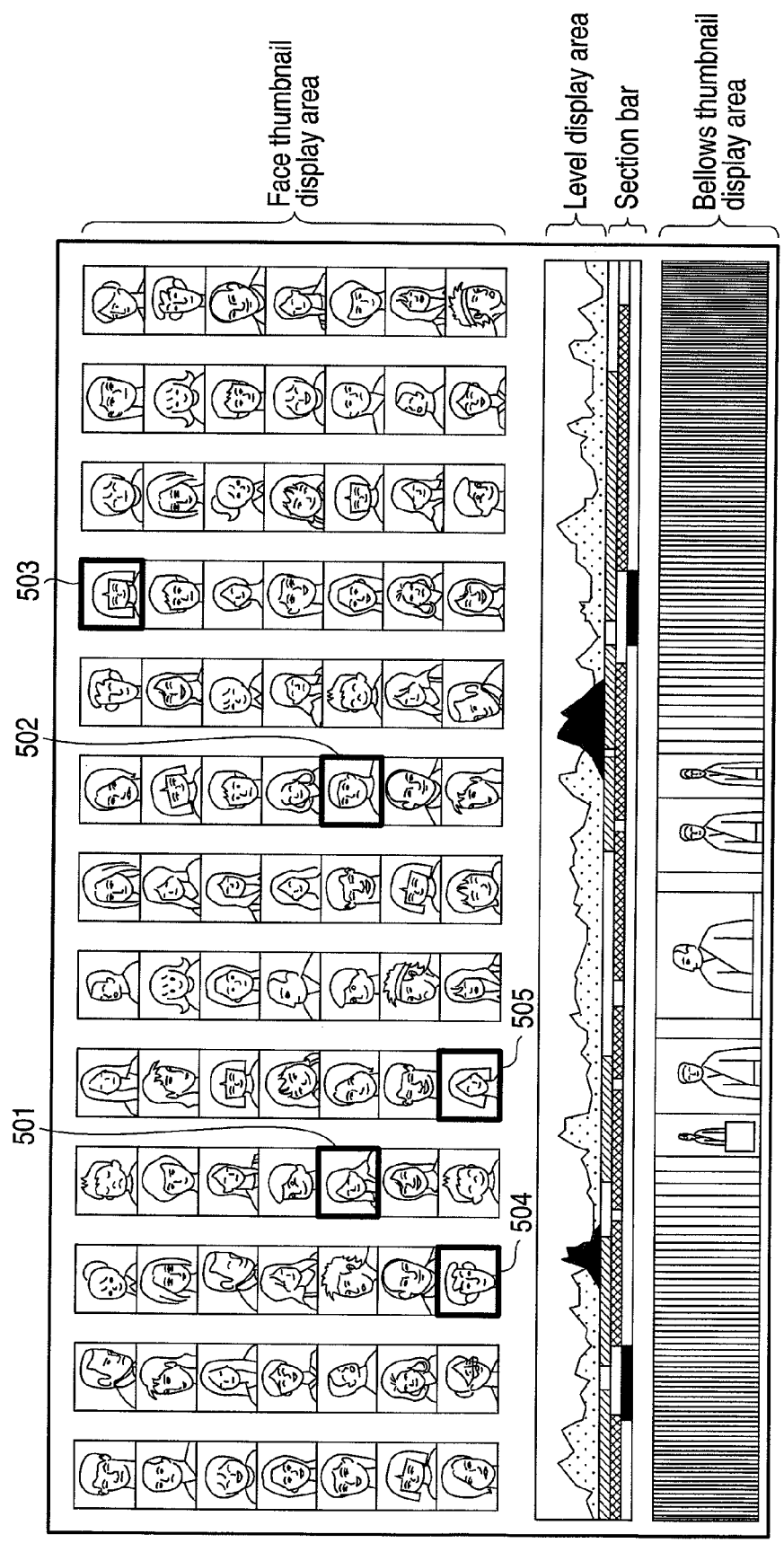
FIG. 6 is an exemplary view showing an example of an indexing view window displayed on a display device by the information processing apparatus according to the embodiment.

The video processor 113 executes various kinds of processing associated with image processing of video content data. The video processor 113 functions as a processing module to execute image processing of video content data. More specifically, in image processing of video content data, the video processor 113 can extract a plurality of face images from moving image data contained in the video content data, and display a list of the extracted face images (face image thumbnails) (to be described later: FIG. 6). The video processor 113 also collates extracted face images with predetermined face images (collation face images) stored in the HDD 111 or the like in advance based on performer names in electronic program information such as an electronic program guide (EPG), and displays a list of face image thumbnails (coincident face images) that have matched upon collation, performer names, recorded video content data, and program titles.

The video processor 113 can also change the display order of, e.g., coincident face images. Collated coincident face images can be displayed in the same order as the performer name display order in electronic program information. Alternatively, the appearance count of each coincident face image in video content data may be measured to display coincident face images in descending order of appearance count. It is also possible to create a favorite priority list to preferentially display, on top, a performer name in the priority list, or preferentially display, on top, a performer name corresponding to a user-designated one of collated coincident face images.

The memory 113A serves as a work memory for the video processor 113. An enormous amount of calculation is necessary for image processing of video content data. In this embodiment, the video processor 113 that is a dedicated processor different from the CPU 101 is used as a back-end processor to execute image processing of video content data. It is therefore possible to execute index processing without increasing the load on the CPU 101.

The sound controller 106 is an audio generation device which outputs playback target audio data to the loudspeakers 18A and 18B or the HDMI control circuit 3.

The wireless LAN controller 114 is a wireless communication device which executes wireless communication based on, e.g., the IEEE 802.11 standard. The IEEE 1394 controller 115 executes communication with an external device via a serial bus of the IEEE 1394 standard.

The embedded controller/keyboard controller (EC/KBC) 116 is a 1-chip microcomputer including an embedded controller for power management, and a keyboard controller to control the keyboard (KB) 13 and the touchpad 16. The embedded controller/keyboard controller (EC/KBC) 116 has a function of powering on/off the computer 10 in accordance with a user operation on the power button 14. The embedded controller/keyboard controller (EC/KBC) 116 also has a function of communicating with the remote controller interface 20.

The TV tuner 117 is a reception device which receives broadcast program data broadcast by a television (TV) signal. The TV tuner 117 is connected to the antenna terminal 19. The TV tuner 117 is implemented as a digital TV tuner capable of receiving digital broadcast program data of, e.g., terrestrial digital TV broadcasting. The TV tuner 117 also has a function of capturing video data input from an external device.

A content data display function to be executed by the TV application program 202 will be explained next with reference to FIG. 3.

Figure 5:
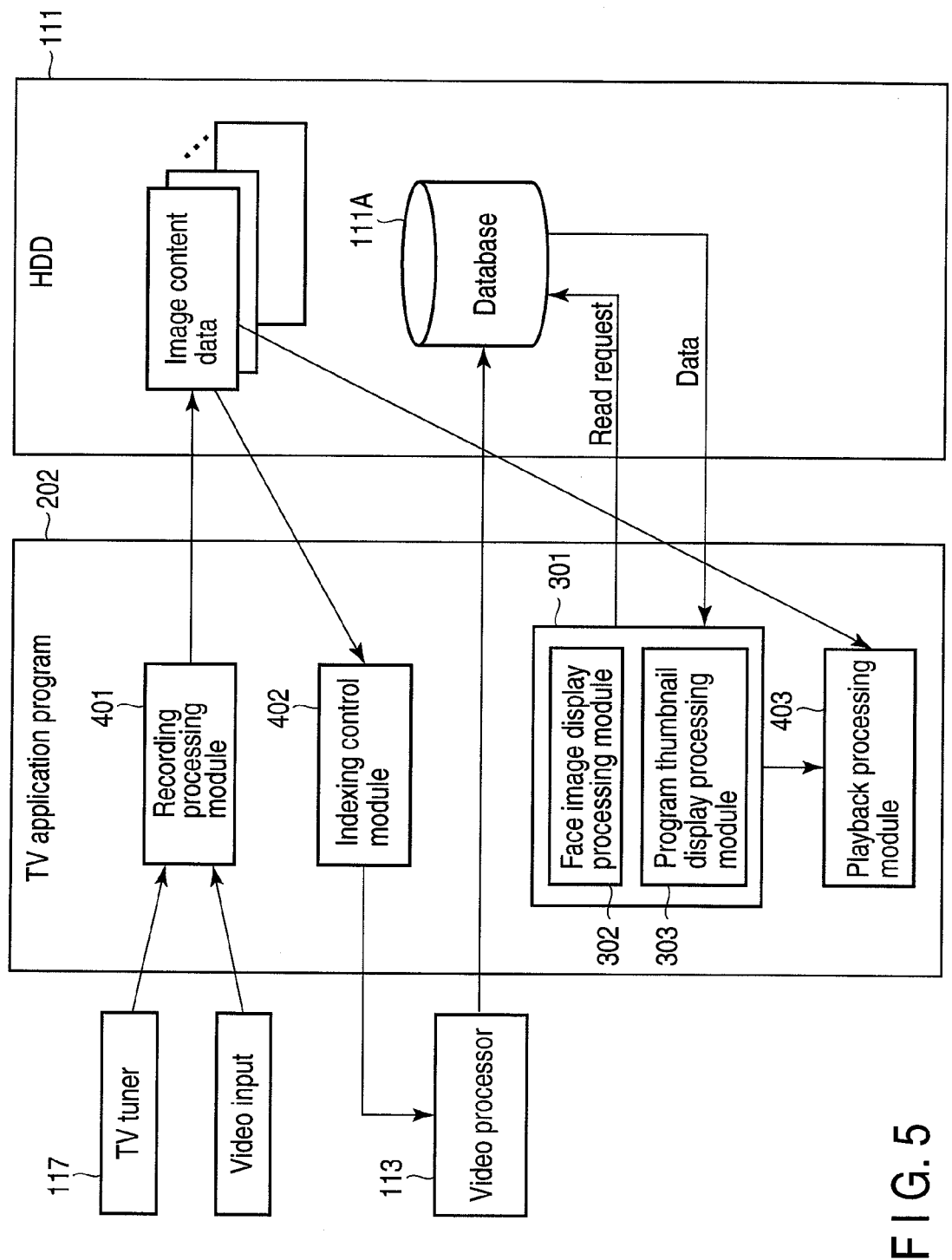
FIG. 5 is an exemplary block diagram showing the functional arrangement and the like of a program used in the information processing apparatus according to the embodiment.

Image processing and content data display processing of video content data such as broadcast program data are executed by the video processor 113 which functions as an indexing control module 402 (FIG. 5 to be described later).

Under the control of the TV application program 202, the video processor 113 executes image processing of video content data such as recorded broadcast program data designated by the user. The video processor 113 can execute image processing of broadcast program data in parallel to recording processing of storing, in the HDD 111, the broadcast program data received by the TV tuner 117.

In the image processing of video content data (also called face image index processing), the video processor 113 analyzes each frame of moving image data contained in the video content data. The video processor 113 extracts the face images (also called face image thumbnails) of persons from each of a plurality of frames of the moving image data, and outputs time stamp information representing a point of time at which each extracted face image appears in the video content data. As time stamp information corresponding to a face image, the elapsed time from the start of video content data to the appearance of the face image or the number of a frame in which the face image is extracted can be used.

The video processor 113 also outputs the size (resolution) of each extracted face image. The video processor 113 also outputs the extraction count (appearance count) of each extracted face image. The greater the face image appearance count is, the longer the appearance time in the video content data is. Face detection result data (face image, time stamp information TS, size, and count) output from the video processor 113 is stored in a database 111A as face image indexing information. The database 111A is a storage area prepared in the HDD 111 to store indexing data.

In the face image index processing, the video processor 113 also executes program thumbnail image acquisition processing in parallel to the face image extraction processing. A program thumbnail image is an image (e.g., reduced image) corresponding to, e.g., a frame of a specific time of video content data. More specifically, the video processor 113 extracts, e.g., a frame of a predetermined time from video content data independently of whether the frame includes a face image, and outputs an image (program thumbnail) corresponding to the extracted frame. The thumbnail image output from the video processor 113 is also stored in the database 111A as thumbnail indexing information.

A plurality of predetermined face images and person names (names) corresponding to them are associated with each other and stored in advance in a dedicated face image server area in the database 111A. These person names are collated with performer names extracted from electronic program information by the video processor 113. A predetermined face image corresponding to a person name that matches a performer name is collated with the face image thumbnails extracted by the face image index processing. A face image (coincident face image) corresponding to a face image thumbnail that matches the predetermined face image upon collation is displayed together with the performer name. When displaying a coincident face image together with a performer name, a program thumbnail extracted by the video processor 113 can also be displayed.

Program information (electronic program information) includes, e.g., a program name, date/time, and performers (performer names), as shown in FIG. 4.

Figure 7:
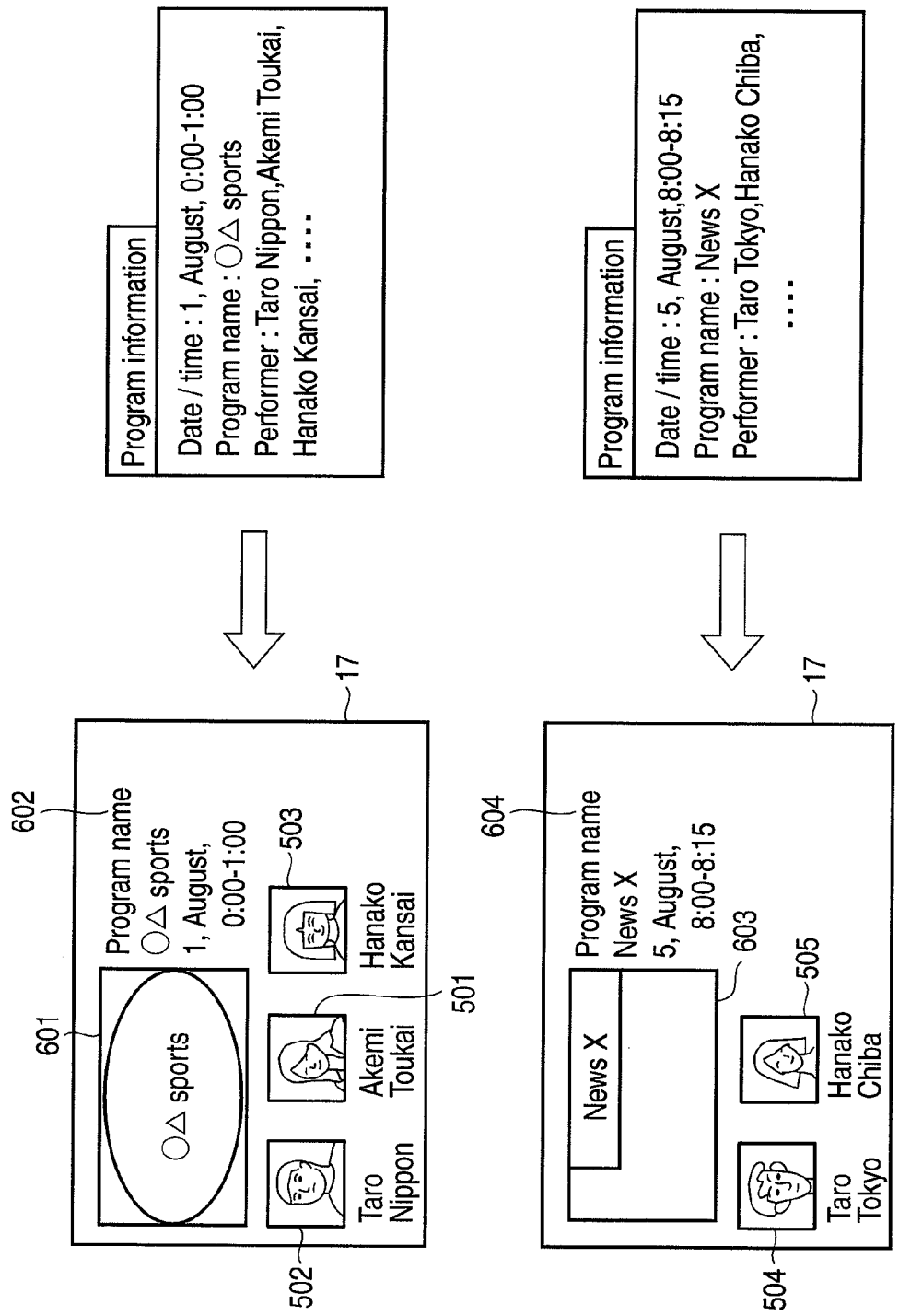
FIG. 7 is an exemplary view showing a display example of video content data displayed on a display device by the information processing apparatus according to the embodiment.

The program name is the title of the program of recorded video content data. The date/time is the recording date/time of recorded video content data. If recorded video content data is edited, for example, the date/time indicates the last editing date/time. The performer names are the names of performers who appear in recorded video content data. When a plurality of performer names exist, they are listed in order. For example, performer names are listed as program information, as shown in FIG. 7.

As shown in FIG. 5, the TV application program 202 includes an image display processing module 301 to execute a video content data list display function. The image display processing module 301 is implemented as, e.g., an indexing viewer program, and displays a list window (to be described later: FIG. 7) to get a general view of video content data using indexing information (e.g., face image thumbnails and program thumbnails) stored in the database 111A. The image display processing module 301 includes a face image display processing module 302 and a program thumbnail display processing module 303.

More specifically, the face image display processing module 302 in the image display processing module 301 collates, e.g., person names which correspond to predetermined face images and are stored in the database 111A in association with the predetermined face images with a performer name extracted from electronic program information. A predetermined face image corresponding to a person name that matches the performer name is collated with face image thumbnails extracted by face image index processing. The face image (coincident face image) represented by a face image thumbnail that matches the predetermined face image upon collation is displayed together with the performer name. For example, when the coincident face image is displayed together with the performer name, the program thumbnail display processing module 303 in the image display processing module 301 can also display a program thumbnail extracted by the face image display processing module 302.

The TV application program 202 includes a recording processing module 401, the indexing control module 402, and a playback processing module 403 in addition to the above-described image display processing module 301.

The recording processing module 401 executes recording processing of recording, in the HDD (storage module, temporary storage module) 111, broadcast program data received by the TV tuner (reception module) 117 or video data input from an external device. The recording processing module 401 also executes reserved recording processing of causing the TV tuner 117 to receive broadcast program data designated by recording reservation information (channel number and date/time) preset by the user and recording the broadcast program data in the HDD 111.

The indexing control module 402 controls the video processor (extraction module, measurement module) 113 and causes it to execute index processing (face image index processing). The user can designate, for each recording target broadcast program data, whether to execute index processing. For example, for recording target broadcast program data for which the user has instructed execution of index processing, index processing automatically starts after the broadcast program data is recorded in the HDD 111. The user can also designate an arbitrary one of video content data already stored in the HDD 111 as video content data which should undergo index processing.

The playback processing module 403 executes processing of playing back video content data stored in the HDD 111.

The index processing need not always be executed by the video processor 113. For example, the TV application program 202 may have the function of executing index processing. In this case, the CPU 101 executes index processing under the control of the TV application program 202.

A detailed arrangement of face image thumbnails that have undergone face image index processing will be described next with reference to FIG. 6.

FIG. 6 shows an example of an indexing view window displayed on the LCD 17 by the image display processing module 301. The indexing view window is obtained by index processing of given video content data (e.g., broadcast program data). The indexing view window includes the above-described face thumbnail display area to display a face image list, a level display area to show the sound level, a section bar indicating, e.g., commercial parts, and the above-described bellows thumbnail display area to display a thumbnail image list in a bellows form.

The bellows form is a display form which displays a selected thumbnail image in a normal size (full size) and other thumbnail images in a horizontally reduced size. In FIG. 6, the greater the distance from the selected thumbnail image is, the smaller the horizontal size of the thumbnail image is.

The level display area displays a graph representing a change in cheer level (graph indicated by a dark color (high level) in FIG. 6 and graph indicated by a light color (low level) in FIG. 6).

The face image thumbnails are collated with predetermined face images corresponding to person names that match the performer names in the program information. Face image thumbnails that match the predetermined face images upon collation are highlighted using, e.g., a bold frame. For example, they are displayed like face images 501 to 505.

FIG. 7 shows a display example of recorded video content data.

The LCD 17 of the personal computer 10 displays, e.g., a program thumbnail 601 or 603, a program name 602 or 604, and the face image thumbnails 501 to 503 or 504 and 505 together. The program thumbnail 601 is data obtained by capturing, e.g., an image corresponding to one frame of a specific time in the video content data, as described above. It is the data of a scene with the program title or a certain scene of the program. The program name is text data extracted from the program information. The face image thumbnails 502, 501, and 503 are coincident face images. To obtain the coincident face images, first, performer names extracted from the electronic program information are collated with person names corresponding to predetermined face images stored in the database 111A, as described above. Predetermined face images corresponding to the person names that match the performer names are collated with the face image thumbnails extracted by face image index processing. The face images (coincident face images) of face image thumbnails that match the predetermined face images upon collation are displayed together with the performer names.

In this way, recorded video content data can be displayed together with the performer names corresponding to coincident face images, the program thumbnail, and the program name. Note that display of the program thumbnail may be inhibited as needed.

Figure 8:
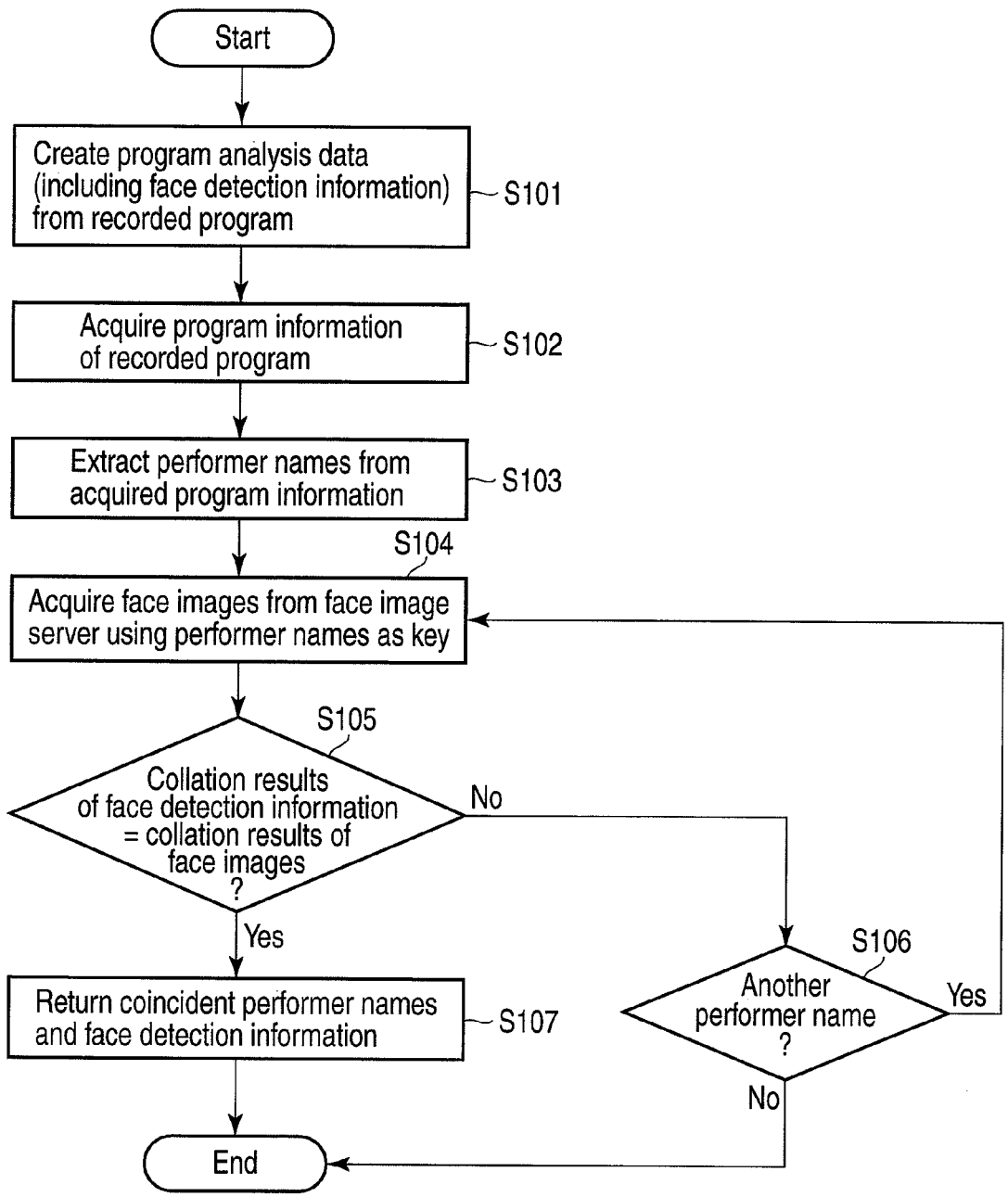
FIG. 8 is an exemplary flowchart illustrating an example of the procedure of image display processing to be executed by the information processing apparatus according to the embodiment.

The procedure of coincident face image extraction in the content data display method according to the embodiment of the present invention will be described next with reference to the flowchart in FIG. 8.

First, the indexing control module 402 in the TV application program 202 performs index processing of a recorded program (video content data) to create program analysis data (block S101). The program analysis data includes face image thumbnails as face detection information. The face image thumbnails form the face image thumbnail list shown in FIG. 6 described above.

Next, the image display processing module 301 in the TV application program 202 acquires, out of items of program information received and stored in the database 111A in advance, program information corresponding to the recorded video content data from the database 111A (block S102). For example, the program information shown in FIG. 4 described above is acquired.

The image display processing module 301 extracts performer names from the acquired program information (block S103). For example, "Taro Nippon", "Akemi Toukai", "Hanako Kansai", and the like are extracted as performer names, as shown in FIG. 4. Subsequently, the image display processing module 301 acquires face images (predetermined face images) from the face image server area of the database 111A using the extracted performer names as a key (block S104). The image display processing module 301 collates the extracted performer names serving as a key with person names stored in the face image server area of the database 111A, and acquires face images (predetermined face images) corresponding to the collated person names from the face image server area of the database 111A.

The image display processing module 301 determines whether the collation results of the face image thumbnails as face detection information match those of the predetermined face images as face images (block S105). If the image display processing module 301 determines in block S105 that the collation results match (YES in block S105), the coincident performer names and the face image thumbnails (coincident face images) as face detection information are returned to the video processor 113 (block S107). Upon determining in block S105 that the collation results do not match (NO in block S105), the image display processing module 301 determines whether the acquired performer names include another performer name (block S106). If it is determined that another performer name exists (YES in block S106), the process returns to block S104. If it is determined that no other performer name exists (NO in block S106), the processing ends.

Figure 9:
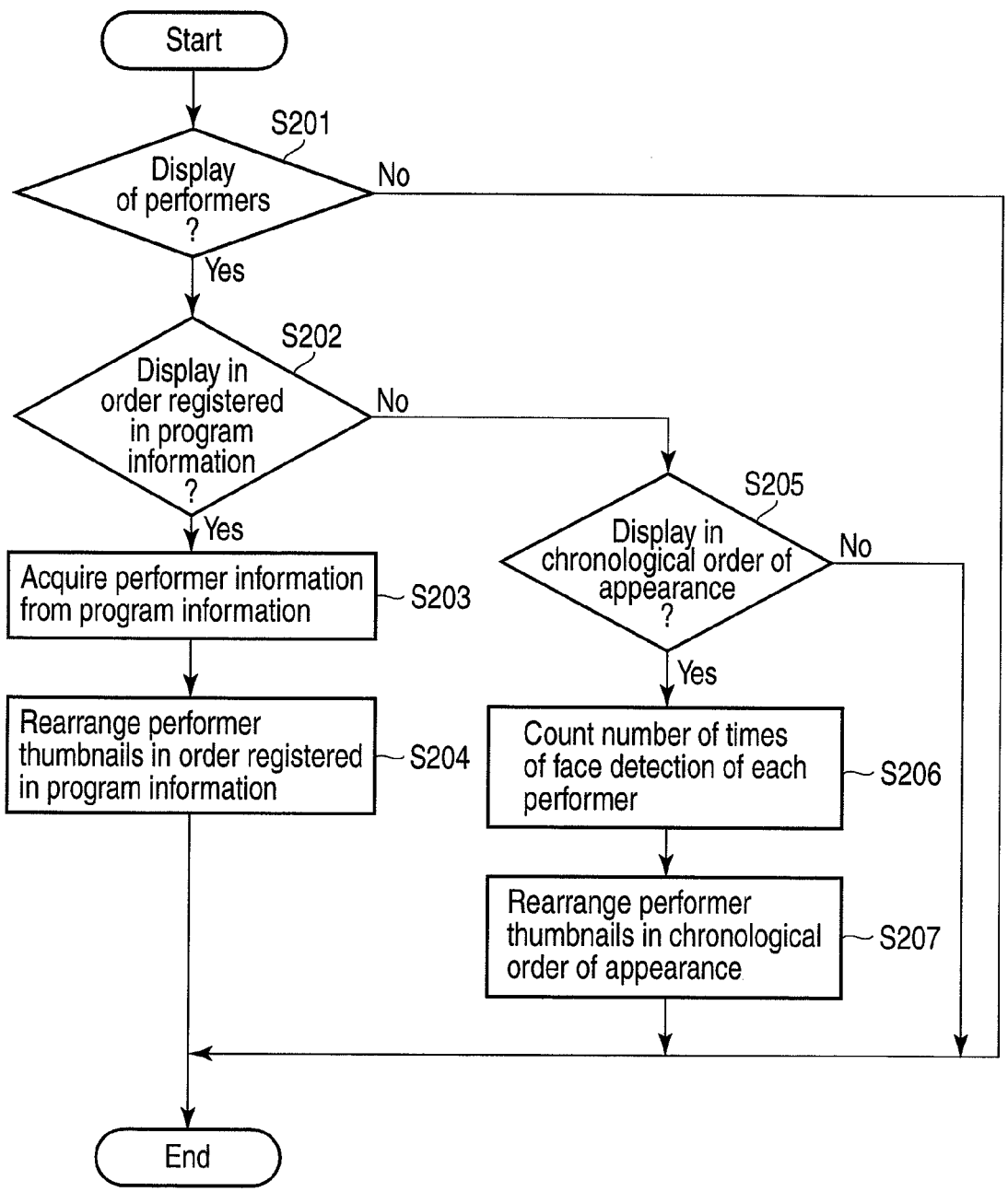
FIG. 9 is an exemplary flowchart illustrating an example of the procedure of image display processing to be executed by the information processing apparatus according to the embodiment.

The procedure of the content display method according to the embodiment of the present invention will be described next with reference to the flowchart in FIG. 9.

First, the image display processing module 301 determines whether the user has made in advance settings to display the performer names (block S201). Upon determining in block S201 that the settings to display the performer names have been made (YES in block S201), the image display processing module 301 determines whether to display the performer names in the order registered in program information (block S202). Upon determining in block S202 that the settings have been made to display the performer names in the order registered in program information (YES in block S202), the image display processing module 301 acquires the performer names from the program information (block S203). For example, the performer names are acquired in the order listed in the program information (Taro Nippon, Akemi Toukai, and Hanako Kansai), as shown in FIG. 7.

The image display processing module 301 rearranges the performer thumbnails (coincident face images) in the order registered (listed) in the program information (block S204), and displays the coincident face images (Taro Nippon 502, Akemi Toukai 501, and Hanako Kansai 503) on the LCD 17 (FIG. 7). On the other hand, upon determining in block S202 that the settings have been made not to display the performer names in the order registered in program information (NO in block S202), the image display processing module 301 determines whether to display the performer names in the chronological order of appearance (block S205). Upon determining in block S205 that the settings have been made to display the performer names in the chronological order of appearance (YES in block S205), the image display processing module 301 counts the number of times of face detection (appearance count) for each performer name (block S206). The number of times of face detection (appearance count) for each performer name is counted upon face image index processing, as shown in FIG. 3. Hence, the image display processing module 301 reads the data of the appearance count. The image display processing module 301 rearranges the performer thumbnails (coincident face images) in the chronological order of appearance (block S207), and displays the coincident face images on the LCD 17.

According to the above-described embodiment, face images are extracted from actually recorded video content data and displayed together with performer names and program names, thereby increasing the convenience of the user. That is, since face images and performer names are displayed based on actually recorded video content data, the user can more intuitively ascertain the performer names of the video content data. Additionally, displaying program thumbnails further increases the convenience.

Figure 10:
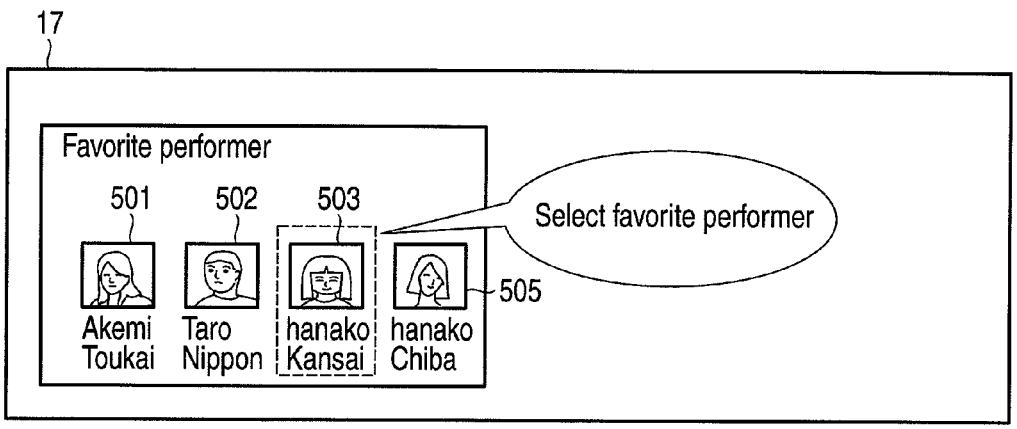
FIG. 10 is an exemplary view showing a display example of video content data displayed on a display device by the information processing apparatus according to the embodiment.
Figure 11:
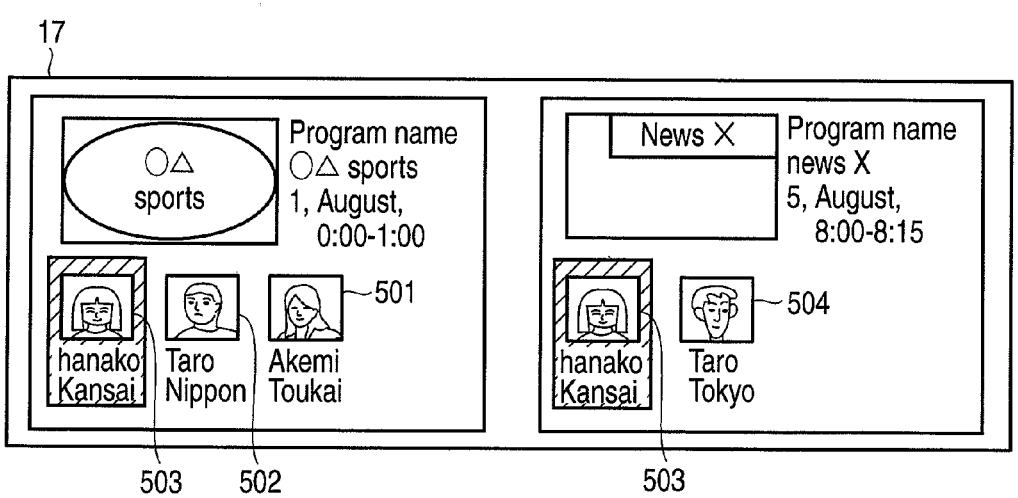
FIG. 11 is an exemplary view showing a display example of video content data displayed on a display device by the information processing apparatus according to the embodiment.

As a modification of the embodiment, a favorite list (priority display list) is stored in the database 111A. The favorite list stores a list of the names of user's favorite persons. For example, as shown in FIG. 10, the user's favorite person names includes Akemi Toukai 501, Taro Nippon 502, Hanako Kansai 503, and Hanako Chiba 504. When displaying coincident face images, the person names included in the favorite list are preferentially displayed. When the user selects a favorite performer on the favorite performer selection window, for example, Hanako Kansai 503 is surrounded by a dotted frame indicating the selection, as shown in FIG. 10. When selecting a favorite performer, information including a pair of a performer thumbnail (coincident face image) and a name is displayed. The performer thumbnail to be displayed can be a performer thumbnail created from a recorded program or a face image in the face image server. In a list of recorded programs (video content data) with favorite performers registered, a performer thumbnail (e.g., Hanako Kansai 503) designated as a favorite is displayed on top independently of the above-described order registered in the program information or the chronological order of appearance, as shown in FIG. 11. In a list of recorded programs, a performer thumbnail (e.g., Hanako Kansai 503) may be displayed in a different color so that the user can recognize the performer designated as a favorite (FIG. 11). Performer thumbnails except the favorite performer are displayed in the order registered in the program information or the chronological order of appearance, as described above.

Figure 12:
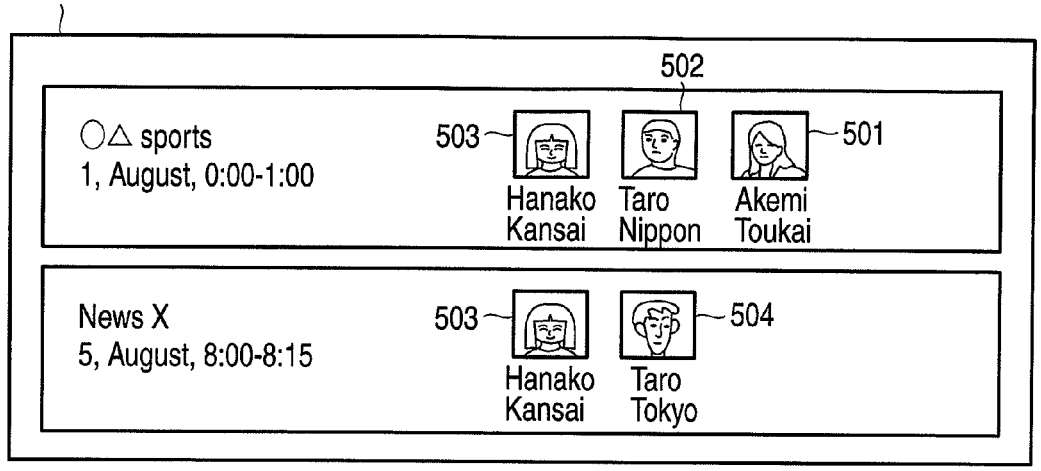
FIG. 12 is an exemplary view showing a display example of video content data displayed on a display device by the information processing apparatus according to the embodiment.

A list of recorded programs may be displayed without program thumbnails. For example, program titles and performer thumbnails suffice as essential information when displaying performer thumbnails in a program list. In this case, a list can be displayed in a form shown in FIG. 12 without program thumbnails. More specifically, without display of program thumbnails, information of recording date/time is displayed in addition to program titles and performer thumbnails.

Figure 13:
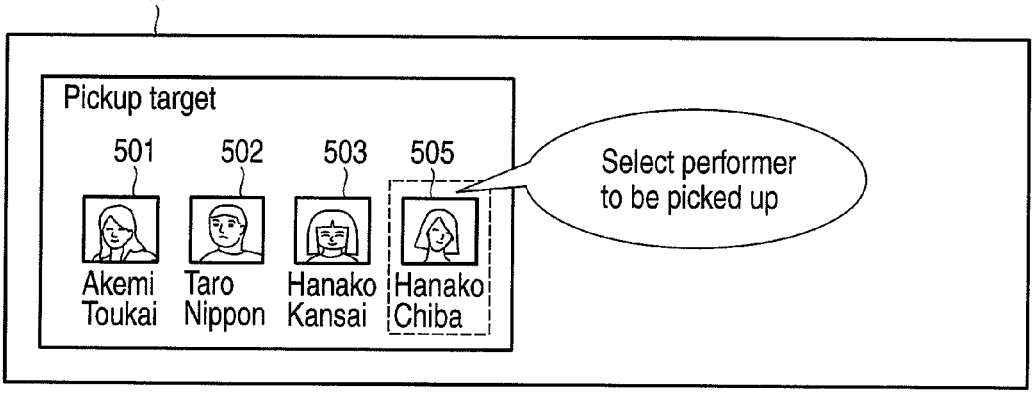
FIG. 13 is an exemplary view showing a display example of video content data displayed on a display device by the information processing apparatus according to the embodiment.
Figure 13:
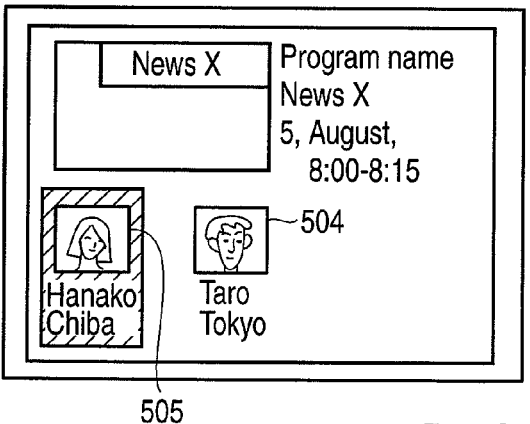

To pick up only programs with a specific performer from a displayed list of recorded video content data, the user selects a performer to be picked up on a pickup target selection window, as shown in FIG. 13. For example, Hanako Chiba 505 is surrounded by a dotted frame indicating the selection. When selecting a pickup target, information including a pair of a performer thumbnail and a name is displayed. The performer thumbnail to be displayed is a performer thumbnail created from a recorded program. When the user selects a pickup target, for example, Hanako Chiba 505, programs with the target performer are selected from all recorded programs and listed. In the display processing, a performer thumbnail (e.g., Hanako Chiba 505) designated as a pickup target is displayed on top independently of the order registered in the program information or the chronological order of appearance (FIG. 13). In a list of recorded programs, the performer thumbnail is displayed in a different color so that the user can recognize the performer designated as a pickup target (FIG. 13). Performer thumbnails except the pickup target are displayed in the order registered in the program information or the chronological order of appearance, as shown in FIG. 7.

As described above, the modification of the embodiment can more specifically implement a video content data display form to suit the preferences of a user. This further increases the convenience of the user.

All the procedures of face image list display processing of the embodiment can be implemented by software. It is therefore possible to easily obtain the same effect as in the embodiment only by installing the software in a normal computer via a computer-readable storage medium. The above-described modules can be accomplished as software or hardware.

The information processing apparatus of the embedment can be implemented not only by the computer 10 but also by various consumer information processing apparatuses such as an HDD recorder, DVD recorder, and TV apparatuses. In this case, the functions of the TV application program 202 can be implemented by hardware such as a DSP or a microcomputer.

Note that the present invention is not exactly limited to the above embodiments, and constituent elements can be modified in the execution stage without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined. A module can be accomplished in software and hardware.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a storage module configured to store a plurality of data for matching in association with a plurality of names;
an input module configured to input video content data;
a retrieving module configured to retrieve program information comprising a program name and performer names corresponding to the video content data;
an extraction module configured to extract a plurality of face images from the video content data;
a first processing module configured to execute first processing in which one or more face images are displayed together with the program name of the video content data for each of the performer names, when information in the video content data is displayed, and when the one or more face images in the extracted plurality of face images correspond to the data for matching associated with the name corresponding to each of the performer names in the program information of the video content data;
a second processing module configured to execute second processing in which the one or more face images are displayed in a descending order of the number of appearances in the video content data, when the information on the video content data is displayed, and when the one or more face images among the extracted face images correspond to the data for matching; and
a switching module configured to switch processing to be executed between the first processing and the second processing.

2. The apparatus of claim 1, wherein the extraction module is configured to extract an image showing a scene of the video content data from the video content data, and the first processing module is configured to display the image showing the scene when the information on the video content data is displayed.

3. The apparatus of claim 1, wherein the retrieving module is configured to retrieve information representing an order in which the performer names are displayed, and the first processing module is configured to display the corresponding one or more face images in the display order, for each of the performer names.

4. The apparatus of claim 1, further comprising a priority display list, wherein:
the first processing module is configured to preferentially display face images corresponding to the priority display list among the one or more corresponding face images for each of the performers.

5. The apparatus of claim 1, further comprising:
a selection module configured to select a name,
wherein the first processing module is configured to preferentially display face images corresponding to the name selected, for each of the performers.

6. A content displaying method for use in an information processing apparatus configured to input video content data, the method comprising:
storing a plurality of data for matching in association with a plurality of names;
retrieving program information comprising a program name and performer names corresponding to the video content data;
extracting a plurality of face images from the video content data;
executing first processing, which is displaying one or more face images together with the program name of the video content data for each of the performer names, when information in the video content data is displayed, and when the one or more face images in the extracted plurality of face images correspond to the data for matching associated with the name corresponding to each of the performer names in the program information of the video content data;
executing second processing, which is displaying the one or more face images corresponding to the data for matching in a descending order of the number of appearances, for each of the performers; and
switching processing to be executed between the first processing and the second processing.

* * * * *